United States Patent
Hoffmann et al.

[19]

[11] Patent Number: 6,157,174
[45] Date of Patent: Dec. 5, 2000

[54] METHOD AND DEVICE FOR DRIVING A CAPACITIVE CONTROL ELEMENT

[75] Inventors: Christian Hoffmann, Regensburg; Benno Larisch, Schwandorf, both of Germany

[73] Assignee: Siemens Aktiengesellschaft, Munich, Germany

[21] Appl. No.: 09/335,563

[22] Filed: Jun. 18, 1999

Related U.S. Application Data

[63] Continuation of application No. PCT/DE97/02509, Oct. 29, 1997.

[30] Foreign Application Priority Data

Dec. 18, 1996 [DE] Germany ............... 196 52 807

[51] Int. Cl.[7] ............... H02J 7/00; H01L 41/08
[52] U.S. Cl. ............... 320/166; 310/316
[58] Field of Search ............... 320/166, 167; 310/316, 317

[56] References Cited

U.S. PATENT DOCUMENTS

| | | | |
|---|---|---|---|
| 4,935,909 | 6/1990 | Matievic | 310/317 |
| 4,947,074 | 8/1990 | Suzuki | 310/317 |
| 5,387,834 | 2/1995 | Suzuki | 310/317 |
| 5,543,679 | 8/1996 | Morino et al. | 310/317 |
| 5,796,206 | 8/1998 | Asai et al. | 310/317 |
| 5,844,792 | 12/1998 | Moreau | 320/166 |
| 5,852,358 | 12/1998 | Ehsani | 320/166 |

FOREIGN PATENT DOCUMENTS

| | | | |
|---|---|---|---|
| 0098165 | 5/1986 | Japan | 310/317 |
| 4166641 | 6/1992 | Japan | 310/317 |

*Primary Examiner*—Peter S. Wong
*Assistant Examiner*—Pia Tibbits
*Attorney, Agent, or Firm*—Herbert L. Lerner; Laurence A. Greenberg; Werner H. Stemer

[57] ABSTRACT

In a drive process of a capacitive control element, especially for a fuel injection valve, a charging of a capacitor having a stipulated voltage is transferred during a stipulated charging time, at least partially, to the control element. A deviation of energy transferred to the control element in the charging time from an experimentally determined curve of stipulated, constant energy for the entire temperature range of the control element is corrected in the subsequent drive processes incrementally by a characteristic mapping of the control element voltage and time.

8 Claims, 2 Drawing Sheets

METHOD AND DEVICE FOR DRIVING A CAPACITIVE CONTROL ELEMENT

CROSS-REFERENCE TO RELATED APPLICATIONS

This application is a continuation of copending International Application No. PCT/DE97/02509, filed Oct. 29, 1997, which designated the United States.

BACKGROUND OF THE INVENTION

Field of the Invention

The invention concerns a method and device for driving a capacitive control element, especially a piezoelectrically operated fuel injection valve of an internal combustion engine.

Piezo control elements are made from a number of piezoceramic layers and form a "stack" that changes dimensions when a voltage is applied, especially the stack's length s by a deviation ds, or generates an electrical voltage during mechanical compression or tension.

The electrical properties of such a piezostack vary with temperature to which it is exposed. With increasing temperature, its capacitance is increased, but so is the deviation. At the temperatures to be considered for automotive applications of about −40° C. to +140° C., changes of up to a factor of 2 are observed, In Published, Non-Prosecuted German Patent Application 196 44 521.3 A, corresponding to U.S. patent application Ser. No. 09/299,367, it was already proposed to drive the capacitive control element with constant energy because loading with constant energy produces a much more constant deviation over the required temperature range.

The deviation varies roughly linearly with an applied voltage at a specified control element capacitance or a specified temperature. If the temperature varies so does the deviation at equal voltage. On the other hand, the deviation varies in proportion to the square of the applied energy $(ds \sim e^2)$, but independently of temperature.

It is very complicated to supply a specified amount of energy to a control element. In the object of the German Patent Application 196 44 521.3 A, current and voltage must be measured, the product integrated from this and the charging process interrupted when the integral value reaches a stipulated value $e=\int uidt$. A simplification is obtained if the control element is charged with a constant current. Multiplication is then unnecessary.

SUMMARY OF THE INVENTION

It is accordingly an object of the invention to provide a method and a device for driving a capacitive control element that overcomes the above-mentioned disadvantages of the prior art methods and devices of this general type, in which process the charging of a capacitive control element with a stipulated amount of energy is much simpler to perform.

With the foregoing and other objects in view there is provided, in accordance with the invention, a process for driving a capacitive control element, including a piezoelectrically driven fuel injection valve of an internal combustion engine, with a stipulated amount of energy, which includes:

discharging, at least partially, a capacitor having a stipulated voltage during a stipulated charging time to a control element during an initial drive process of the control element; and changing the stipulated charging time during a next drive process by an amount of time stored in a region of a mapping relating to the stipulated charging time and to a charge voltage of the control element achieved during the stipulated charging time.

In an alternative process, a voltage of the control element can be used for controlling the charging time of the control element.

Other features that are considered as characteristic for the invention are set forth in the appended claims.

Although the invention is illustrated and described herein as embodied in a method and a device for driving a capacitive control element it is nevertheless not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTIONS OF THE DRAWINGS

DESCRIPTION OF THE PREFERRED EMBODIMENTS

Figure 1:
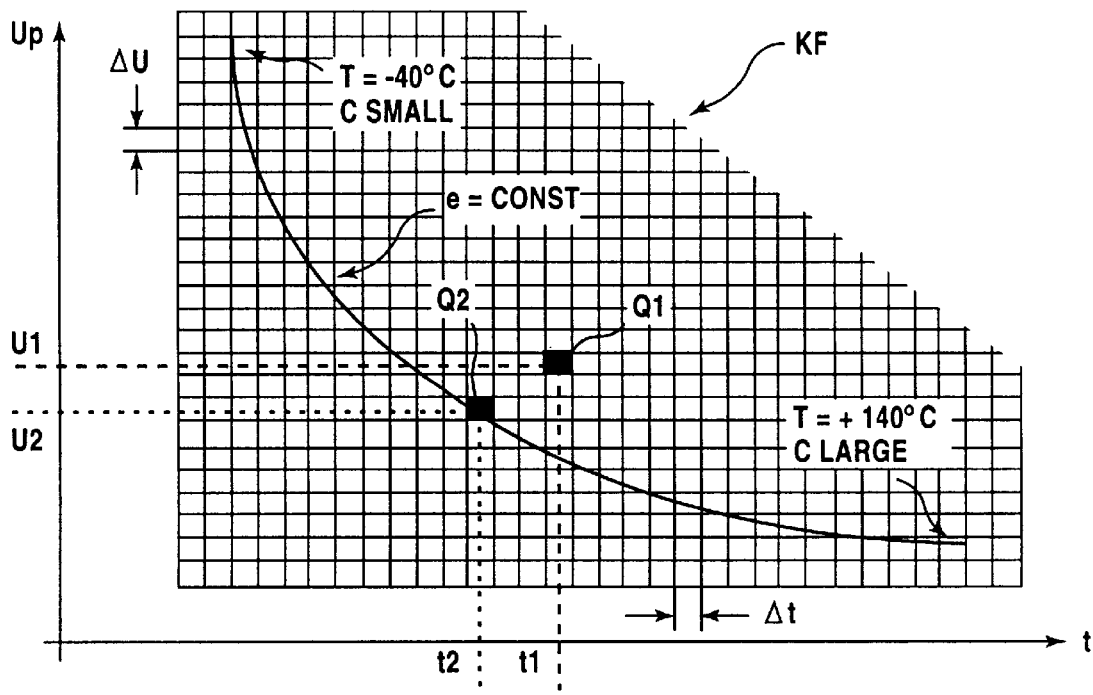
FIG. 1 is a diagrammatic mapping KF for a charging time t and is an obtainable control element voltage Up according to the invention.

The invention starts from the consideration that the changes in control element capacitance are temperature-related changes that exhibit very large time constants relative to the timing of successive control element activations in an internal combustion engine. It is, therefore, not necessary to execute control of charging in the control cycle (drive process) itself. It is fully sufficient to detect a control deviation in a drive process and to correct the control deviation in a subsequent drive process.

In all the figures of the drawing, sub-features and integral parts that correspond to one another bear the same reference symbol in each case. Referring now to the figures of the drawing in detail and first, particularly, to FIG. 2 thereof, there is shown a circuit formed of a control element P that is charged from a capacitor C. The capacitor C is charged to a stipulated voltage Uc, through an oscillation coil L, which, together with the control element P, form an oscillation circuit, during a charging time t=t1 stipulated for a first drive process. According to a capacitance of the control element P, which is dependent on a instantaneous control element temperature T and is the only significantly variable unknown in the oscillation circuit that is dependent on the temperature T, the control element P reaches a specified charge voltage Up=U1.

FIG. 1 shows a mapping, on whose abscissa the time t is plotted in steps $\Delta t$ for the charging time t, and on whose ordinate the control element voltage Up achieved in during the charging time t is plotted in steps $\Delta U$. For example, $\Delta t=1$ $\mu s$ and $\Delta U=0.5$ V in real maps deviating from FIG. 1 with essentially smaller mapping areas. An experimentally determined curve e of constant energy is entered and stored in the mapping for better understanding. The curve e is obtained in the circuit according to FIG. 2 as the control element P traverses through its temperature range and, in so doing, changes its capacitance (upper left=low capacitance at low temperature; lower right=high capacitance at high temperature). If the energy is supplied to the control element P (which is the case when the intersection of t and Up lies on the curve e), a constant control element deviation over the entire temperature range is achieved.

In the example of FIG. 1 the mapping region Q1 assigned to the stipulated charging time t1 and the charging voltage U1 achieved with the charging time t1 lies above the curve e constant. Therefore, too much energy was supplied to the control element P. In examples where a mapping region Q lies below the curve, too little energy is supplied to the control element.

There are different methods to reach a point from a curve in a mapping. The shortest path leads from the point on a normal to the curve through the point. The simplest method is an incremental approach in equal steps, which is described below. Depending on the distance from the curve, the step width can also be of a difference size, so that rapid approach to the curve is attainable at a large distance.

In the practical example with equal incremental steps a negative number "−1" is entered in all the regions above the curve e that are not touched by the curve, a positive number "+1" in all regions below curve e and a "0" in all regions that are touched by the curve. "+1" means that the next charging time must be increased by $\Delta t$. "−1" means that the next charging time must be reduced by $\Delta t$. "0" means that the charging time remains unchanged. A "0" can also be entered in regions with limited spacing from curve e, so that control element regulation does not function too "sensitively".

Starting from the region Q1 (t1, U1), which is reached in the first drive process, charging time t2 is determined in this practical example after two or three incremental steps, in which a charge voltage U2 corresponding to region Q2 is reached on the control element P. Curve e passes through region Q2. In the next drive processes, other charging times t are set, only during temperature-related capacitance changes, in which the charging is controlled such that essentially regions along the curve e are reached.

Figure 2:
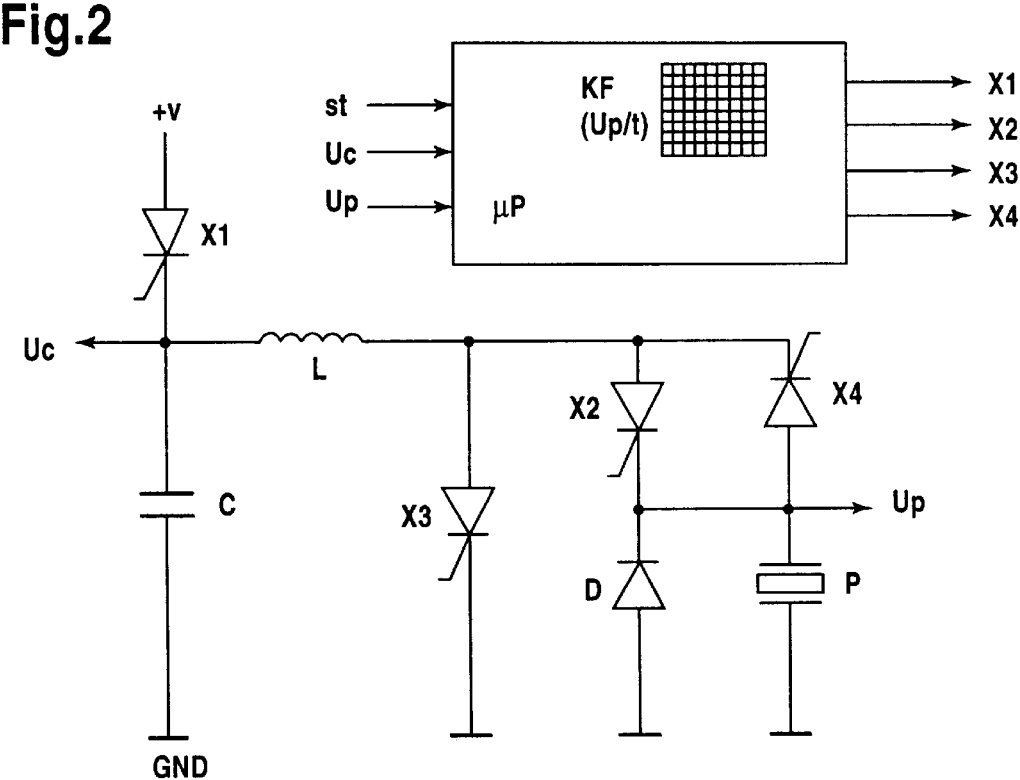
FIG. 2 is a circuit diagram of a control element drive circuit.

FIG. 2 shows a circuit diagram to drive a non-illustrated fuel injection valve of an internal combustion engine through the piezoelectric control element P by an ordinary microproceesor-controlled control circuit $\mu P$.

A series circuit made of a controlled, electronic power switch X1, which conducts current in only one direction, and the capacitor C, which lies between a plus pole or terminal +V and a minus pole or terminal GND of a power supply.

In the subsequent description, when switches X1 to X4 are discussed, these are electronic switches made of at least one semiconductor element that conducts current in only one direction, preferably thyristor switches, which are driven by the control circuit $\mu P$.

A series circuit formed of the oscillation coil L connected to the power switch X1 and a charging stop switch X3, whose function is explained later, lies parallel to the capacitor C.

Parallel to the charging stop switch X3 are a series circuit, made of a parallel circuit including a charging switch X2, which conducts current in a direction away from the oscillation coil L, and a discharge switch X4, which conducts current in the direction toward the oscillation coil, and a parallel circuit made of the control element P with a diode D, which conducts current in the direction toward charging switch X2.

The switches X1 to X4 are controlled by the microprocessor-controlled control circuit $\mu P$ dependent on an external control signal st, the capacitor voltage Uc, and the control element voltage Up.

The mapping KF according to FIG. 1 (having regions Q of size $\Delta t$, $\Delta U$) is contained in the microprocessor-controlled control circuit $\mu P$. The contents "+1", "−1" or "0" are stored in the regions Q.

The method for driving the circuit according to FIG. 2 is further explained with reference to a flow chart shown in FIG. 3, Starting from an initial state (state 10), in which the capacitor C is fully charged to the stipulated voltage Uc, all switches X1 to X4 are nonconducting and the oscillation coil L is currentless, With the beginning of an external control signal st=1 (state 20), the charge switch X2 is activated (made current-conducting). The capacitor C thus begins to discharge through the oscillation coil L into the control element P that acts like a capacitor that is charged (stage 30), which causes a length change of the piezo control element P. The voltage being applied to the control element P rises.

Simultaneously with the beginning of charging, there is a query on whether or not the charging process is the first charging process (after engagement of the ignition switch) (state 40). If such is the case, the charging time tn is set to the stipulated value t1 (state 50).

After the charging time elapses (state 70), which, like all time measurements, is measured with the internal cycle of the control circuit, the charging process is ended, the charging switch X2 becomes nonconducting, X2=0, and the charge stop switch X3 becomes conducting (X3=1, state 80). The oscillating circuit L-C continues to oscillate until the oscillating coil L is currentless. The charging state of the control element P is retained, as long as the control signal st is applied.

After the end of the charging of the control element P, the voltage Up applied to the control element P is measured (state 90), and the region Qn in the mapping KF assigned to the value Up in the charging time tn is determined (state 100). The charging time tn is then corrected by a content of Qn (state 110). According to the example described in FIG. 1 of a first drive process (charging process), tn=t1, the control element voltage Up obtained with it was U1; corresponding to the mapping region Q1. The content of Q1 is "−1", i.e., "−1*$\Delta t$". We thus obtained for the next drive process: tn=t1−$\Delta t$. The value for tn is stored in a storage field prescribed for it and is stipulated as the charging time in the next drive process (state 60, because is the drive process is no longer the first drive process).

A wait state occurs (state 120) until the control signal st disappears (st=0). When the control signal at disappears, the control element P must be discharged. To accomplish the discharge, the charge stop switch X3 is made nonconducting, X3=0, and the discharge switch is made conducting, X4=1 (state 130). The control element P is now discharged through the oscillation coil L into the capacitor C. If the control element P is discharged to the threshold voltage of the diode D, this assumes the current; the oscillating circuit L-C continues to oscillate until the oscillation coil is currentless. Switch X4 becomes nonconducting, For recharging of the capacitor C (state 140), the power switch X1 is controlled conducting until the capacitor C is charged to the stipulated voltage Uc (state 150). The power switch X1 is then controlled nonconducting (state 160). A drive process of the control element P is then ended and a new one can start. Instead of stipulating a specific charging time tn and the determination of the control element voltage Up achieved in this time, it is just as possible to stipulate a specific control element voltage using the same mapping (FIG. 1) or to control it and to measure the charging time required for this.

Figure 3:
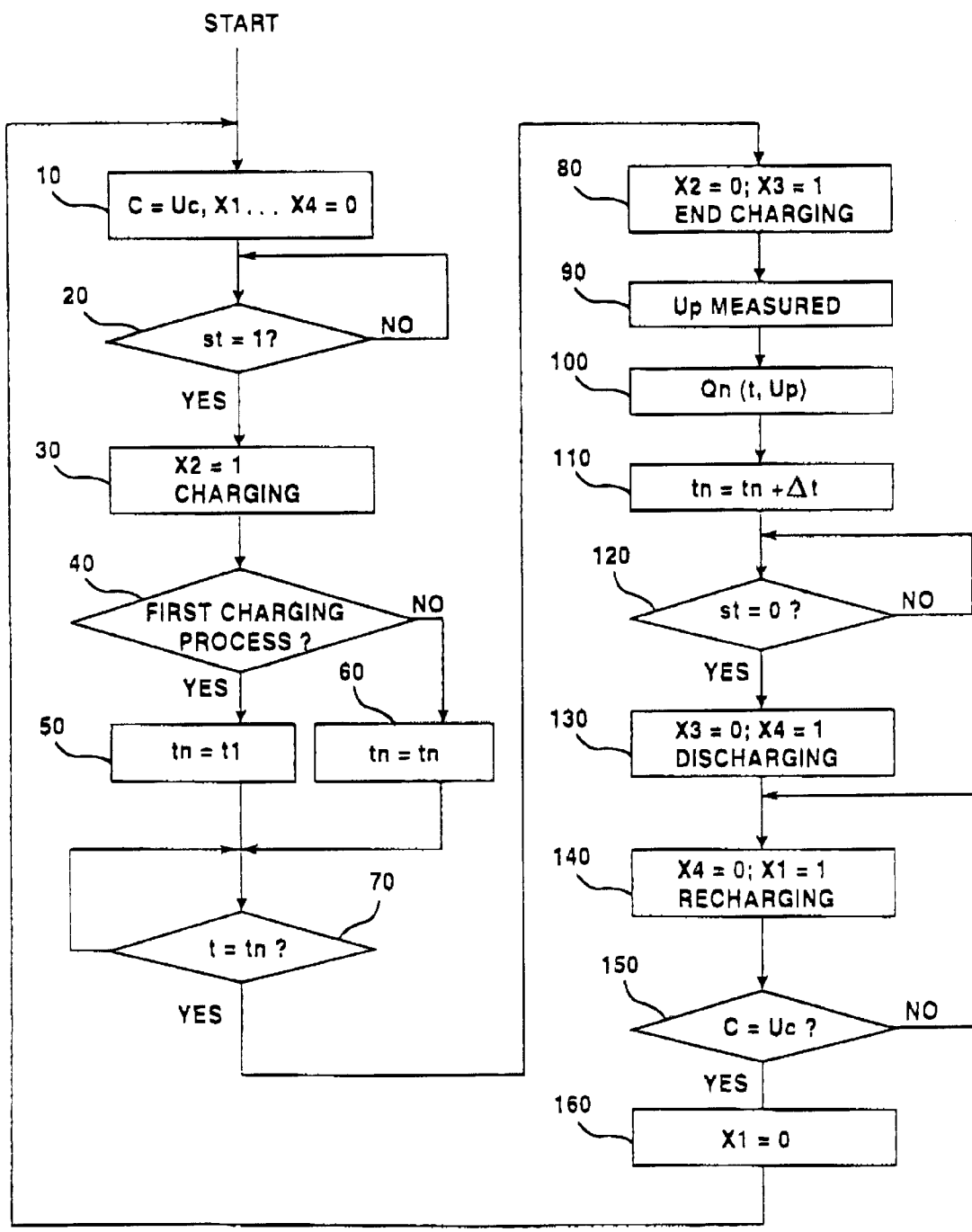
FIG. 3 is a flow chart for a method of operation of the circuit according to FIG. 2.

During use of several fuel injection valves in an internal combustion engine with capacitive control elements, a circuit configuration shown in FIGS. 3 or 4 of the German Patent Application 196 32 872.1 can be used.

In the control circuit, an intrinsic mapping KF can be prescribed for each control element, but a switchable mapping can also be prescribed for all control elements or for each control element group (bank).

We claim:

1. A process for driving a capacitive control element, including a piezoelectrically driven fuel injection valve of an internal combustion engine, with a stipulated amount of energy, which comprises:

at least partially discharging a capacitor having a stipulated voltage during a stipulated charging time to a control element during an initial drive process of the control element; and changing the stipulated charging time during a next drive process by an amount of time stored in a region of a mapping relating to the stipulated charging time and to a charge voltage of the control element achieved during the stipulated charging time.

2. The process according to claim 1, which comprises defining an experimentally determined curve of constant energy from regions in the mapping that have a predetermined amount of energy, wherein the predetermined amount of energy is transferred from the capacitor charged to the stipulated voltage to the control element depending on a corresponding temperature-dependent control element capacitance during the stipulated charging time associated with a corresponding region when the control element is charged to a charge voltage associated with the corresponding region.

3. A process for driving a capacitive control element, including a piezoelectrically driven fuel injection valve of an internal combustion engine, with a stipulated amount of energy, which comprises:

discharging a capacitor charged to a stipulated voltage to a control element until the control element being charged to a stipulated charge voltage during a drive process of the control element; and changing the stipulated charge voltage during a next drive process by an amount stored in a region of a mapping relating to the stipulated charge voltage and to a charging time of the control element.

4. The process according to claim 2, which comprises defining an experimentally determined curve of constant energy from regions in the mapping that have a predetermined amount of energy, wherein the predetermined amount of energy is transferred from the capacitor charged to the stipulated voltage to the control element depending on a corresponding temperature-dependent control element capacitance when the control element is charged to a charge voltage associated with the corresponding region in a charging time associated with the corresponding region.

5. A device for performing a charging process, comprising:

a power switch to be connected to a power supply having a positive terminal and a negative terminal;

a capacitor to be charged from the power supply via said power switch and disposed between the positive terminal and the negative terminal of the power supply;

a first series circuit disposed parallel to said capacitor and containing an oscillation coil connected to said power switch and a charging stop switch;

a second series circuit disposed parallel to said charging stop switch and containing a first parallel circuit of a discharge switch conducting current to said oscillation coil and a charging switch conducting current away from said oscillation coil and a second parallel circuit formed of a control element and a diode conducting current in a direction toward the negative terminal; and a control circuit storing stipulated values for a capacitor voltage of said capacitor, control element charging times, and a mapping having regions defining corrections for said control element charging times and for a charging voltage of said control element in dependence on actual control element charging times and actual charging voltage of said control element, said control circuit receiving an external control signal, said capacitor voltage and said actual charging voltage of said control element, said control circuit controlling a switching state of said power switch, said charging switch, said charging stop switch and said discharge switch for allowing a charging and discharging of said capacitor and said control element;

said capacitor during a stipulated charging time of said control element, discharging at least partially, to said control element during an initial drive process of said control element; and said stipulated charging time during a next drive process being changed by an amount of time stored in one of said regions of said mapping.

6. The device according to claim 5, wherein said control element is a plurality of control elements and said mapping is provided for each individual control element of said plurality of control elements.

7. The device according to claim 5, wherein said control element is a plurality of control elements and said mapping is provided for each grouping of said control elements of said plurality of control elements.

8. The device according to claim 5, wherein said control element is a plurality of control elements and said mapping is provided for all said plurality of control elements together.

* * * * *